Patented Nov. 16, 1943

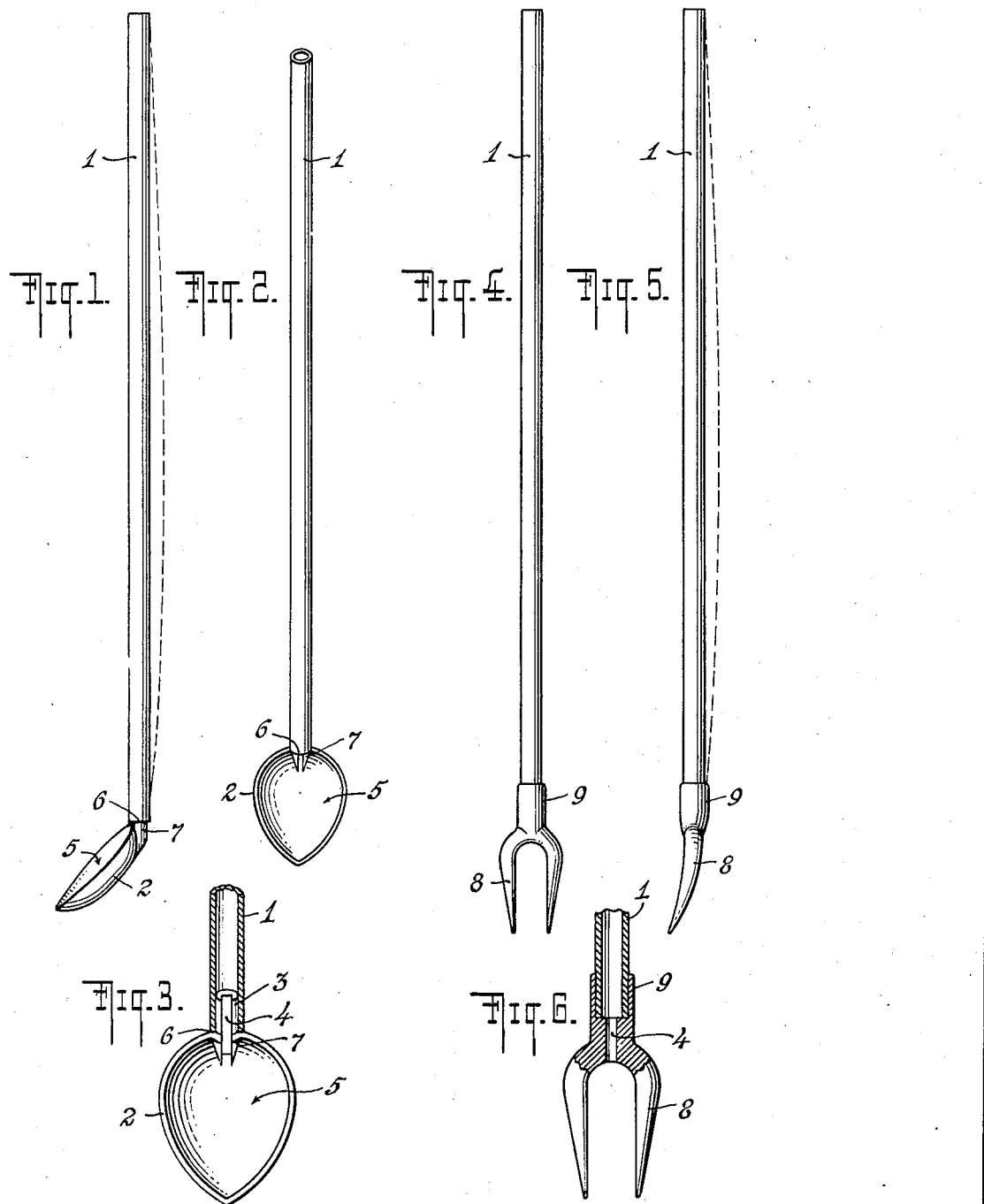

2,334,535

UNITED STATES PATENT OFFICE 2,334,535

SIPPER

Benjamin H. Bandell, New York, N. Y.

Application August 7, 1942, Serial No. 453,967

3 Claims. (Cl. 30—137)

This invention relates to sippers of the type which comprises a spoon, fork or other implement carried by a hollow handle, used in connection with drinks made up of liquids and solids such as fruit and the like.

The object of the invention is to provide a strong, non-breakable sipper having a hollow, flexible handle constituting the sipping member and an inflexible implement at one end of the sipping member such as a spoon, fork or the like. The advantages of such a construction are set forth hereinbelow.

In the drawing, Fig. 1 is a side elevation of the device; Fig. 2 a front view of the device of Fig. 1; Fig. 3 an enlarged front view of the lower portion of the device of Fig. 2, partly in section; Fig. 4 is a front view of the device of Fig. 5; Fig. 5 is a side elevation of a device similar to Fig. 1 with a different type of implement at the end thereof; and Fig. 6 an enlarged front view of the lower portion of the device of Fig. 4, partly in section. The views in Figs. 1, 2, 4 and 5 are shown in actual dimensions of commercial devices.

The handle 1 of the sipper is made of flexible material, preferably of suitable plastic, tubular in configuration and hollow throughout its length. The implement 2 in Figs. 1 and 2, in the form of a molded spoon, is made of a suitable, substantially stiff, non-flexible, non-shatterable material, preferably plastic, provided at the back thereof with an upwardly extending member 3 in the form of a short post provided with a groove or channel 4 which extends throughout the length of the post and communicates with the depression 5 of the spoon 2. The member 3 has such a diameter as to snugly fit into the hollow handle 1 wherein it may be secured by suitable cementitious material as to be permanently secured to the handle and whereby communication is established by the channel 4 between the inside of the handle and the depression 5 in the spoon. The length of the member 3 is such as to extend but a short distance into the lower end of the handle 1 and by reason of the abutment of its extreme lower edge 6 against the bead 7 of the member 3 and of the snug fit of the member 3 in the terminal end of the handle 1, the handle 1 and the member 3 at their junction support and strengthen each other.

Figs. 4, 5 and 6 show a modification in which a fork member 8 is provided on a hollow handle 1. In this instance the terminal end of the hollow handle 1 fits snugly within a ferrule 9 formed at the upper end of the fork member 8 and may be cemented therein. The fork member 8 is provided with a groove or channel 4 which has communication with the hollow handle 1 and the space between the two tine members of the fork 8. In this modification the inter-fitting relation of the flexible handle and the ferrule 9 provides added strength and stiffness both to the ferrule and to the terminal edge of the handle 1.

The handle and the implement at the end thereof may be made in the same or contrasting colors.

This invention provides a device which is non-breakable, in contradistinction to a device of this type made of glass. If made of glass, the handle and the spoon of these devices would have a great weakness at the point of junction of these two parts and pressure on the spoon member would tend to break the point of junction between the handle and the spoon member, causing the destruction of the device and the danger of glass particles falling into the drink contained in the glass. In the device of this invention, which is readily usable with mixed drinks containing sugar and fruit and added liquids, the spoon member can be used for stirring. It is the practice of persons stirring such drinks to apply pressure to the handle, particularly in order to stir the deposited sugar and thus mix the sugar with the rest of the drink and to overcome resistance of ice contained in the drink. Such pressure will tend to cause the handle 1 to bow or flex, as is illustrated by the broken line in Figs. 1 and 5. The major portion of the bowing or flexing takes place between the point where the fingers grasp the handle and the point above the top edge of the member 3 in the spoon type of implement and the top edge of the ferrule 9 in the fork type of implement. No substantial bowing takes place in the region of the member 3 and the ferrule 9, inasmuch as these parts are strengthened and quite solid whereby all tendency to fracture is eliminated. Inasmuch as the implements 2 and 8 are stiff and non-flexible when pressure is brought thereagainst by reason of contact of the spoon or fork with the bottom of the glass, there is a tendency for these implements to change their angle of relation to the vertical. In the instance of the spoon type of device, this change of angularity tends to place the spoon member more or less parallel to the bottom of the glass which readily permits scooping up of fruit from mixed drinks.

The member 3, which in the drawing is shown as a means for uniting a spoon to the handle 1, may be obviously utilized for uniting a fork or other implement to the handle, and likewise the ferrule 9 may be utilized for securing a spoon or other implement to the handle. Of the two types of connecting means 3 and 9, the ferrule type 9 is the more expedient to manufacture, and the inserted handle, in the ferrule, may be provided with a pair of suitable sipping apertures by drilling simultaneously through the ferrule and the inserted portion of the handle which would be providing sipping apertures at the sides of the straw rather than between the tines. The fork type of device may be readily used as a stirrer, and fruits and the like can be readily picked up with the tines.

The liquids in drinks may be drawn into the mouth through the tube of the hollow handle 1 and the groove 4.

I claim:

1. A sipper comprising an elongated handle hollow throughout its length and a fork member connected to the lower end of said handle, said handle being made of plastic material and capable of being temporarily flexed under applied pressure and said fork member being stiff and relatively inflexible, the body of said fork projecting beyond the adjacent end of said handle and the tines thereof being composed of solid material, an integral extension connecting the upper end of said fork member with said handle and rigidifying the engaged end portion of the latter against bending, the upper end portion of said fork member having a substantially longitudinally extending fluid passageway connecting the interior of the handle with the atmosphere, said passageway extending through the portion of such member from which the tines project and terminating at its lower end at a point located between the tines of such fork member.

2. A sipper comprising an elongated hollow handle and a fork member connected to the lower end of said handle, said handle being capable of being temporarily flexed under manual pressure applied by a user to change the normal angular relation between said handle and the attached fork member and without damage to said handle and said fork member being stiff and relatively inflexible and including a body portion projecting beyond the adjacent end of said handle and having tines composed of solid material, an extension integrally connected at its lower end to the upper end of the fork body and projecting upwardly therefrom to provide a connection between the fork body and the handle, said extension being rigid with respect to said fork body and being of such dimensions with respect to the engaged end portion of said handle that the latter is rigidified against bending so that any substantial flexure of the handle under the applied pressure takes place in the handle above the upper end of said extension, means for properly supporting said extension on the lower terminal end of said handle and the upper end portion of said fork member having a fluid opening connecting the interior of the handle with the atmosphere at a point located in the upper end portion of the fork member.

3. A sipper comprising an elongated hollow handle and a food manipulating implement cemented to the lower end of said handle, said handle being formed of flexible plastic material capable of being temporarily flexed under manual pressure applied by a user to change the normal angular relation between said handle and the attached implement and without damage to said handle and said implement being stiff and relatively inflexible and including a body portion projecting beyond the adjacent end of said handle and the working portion thereof being composed of solid material, an extension integrally connected at its lower end to the upper end of the implement and projecting upwardly therefrom to provide a connection between the implement and the handle, said extension being rigid with respect to said implement and being of such dimensions with respect to the engaged end portion of said handle that the latter is rigidified against bending so that any substantial flexure of the handle under the applied pressure takes place in the handle above the upper end of said extension, the extension having a fluid opening connecting with the interior of the handle.

BENJAMIN H. BANDELL.